United States Patent [19]
Franklin

[11] Patent Number: 5,123,768
[45] Date of Patent: Jun. 23, 1992

[54] ARTICULATING POSITIONING DEVICE FOR TOOLS

[76] Inventor: Ronald D. Franklin, 5266 L St., Sacramento, Calif. 95819

[21] Appl. No.: 740,916

[22] Filed: Aug. 6, 1991

[51] Int. Cl.⁵ .............................................. F16C 11/00
[52] U.S. Cl. ...................................... 403/96; 403/97; 403/84
[58] Field of Search ........................ 403/97, 96, 73, 84

[56] References Cited

U.S. PATENT DOCUMENTS

| | | |
|---|---|---|
| 437,650 | 9/1890 | Huntington ............................ 403/97 |
| 501,084 | 7/1893 | Landis ................................... 403/73 |
| 1,268,734 | 6/1918 | Lay . |
| 1,301,475 | 4/1919 | Mellin ............................... 403/84 X |
| 2,555,226 | 5/1951 | Draughn ............................... 403/73 |
| 2,602,863 | 7/1952 | Raymond et al. . |
| 2,680,032 | 6/1954 | McClenahan . |
| 3,277,601 | 10/1966 | Ryan . |
| 3,419,295 | 12/1968 | Small . |
| 3,487,689 | 1/1970 | Weiss et al. . |
| 4,530,262 | 7/1985 | Pownall . |
| 4,614,452 | 9/1986 | Wang . |
| 4,747,569 | 5/1988 | Hoshino ............................... 248/286 |
| 4,815,740 | 3/1989 | Williams et al. . |
| 4,848,818 | 7/1989 | Smith . |
| 4,962,722 | 10/1990 | Thompson . |
| 5,039,118 | 8/1991 | Huang ............................... 403/97 X |
| 5,062,179 | 11/1991 | Huang ............................... 403/93 X |

Primary Examiner—Andrew V. Kundrat
Attorney, Agent, or Firm—John P. O'Banion

[57] ABSTRACT

An adjustable jointed coupling (10) for attaching paint rollers, paint brushes, paint shields, and other tools to detachable handles or extension rods, which is rotatable about a central axis through a displacement window of approximately two-hundred degrees. The jointed coupling (10) includes a shank (50) with male threads (52) for accepting a paint roller handle or the like, and a shank (12) with female threads (14) for accepting a handle or extension rod. Each half of the coupling is geared internally and may be locked into a selected position by means of a single gear (36) which engages both halves of the coupling (10) simultaneously. A single push button (102) releases the gear (36) for rotation of the two halves of the coupling and re-engages the gear to lock the selected position. The gear and lock mechanism is constructed such that the push button (102) can be depressed and the coupling (10) adjusted and locked into a new position with the use of only one hand.

15 Claims, 3 Drawing Sheets

FIG.—1

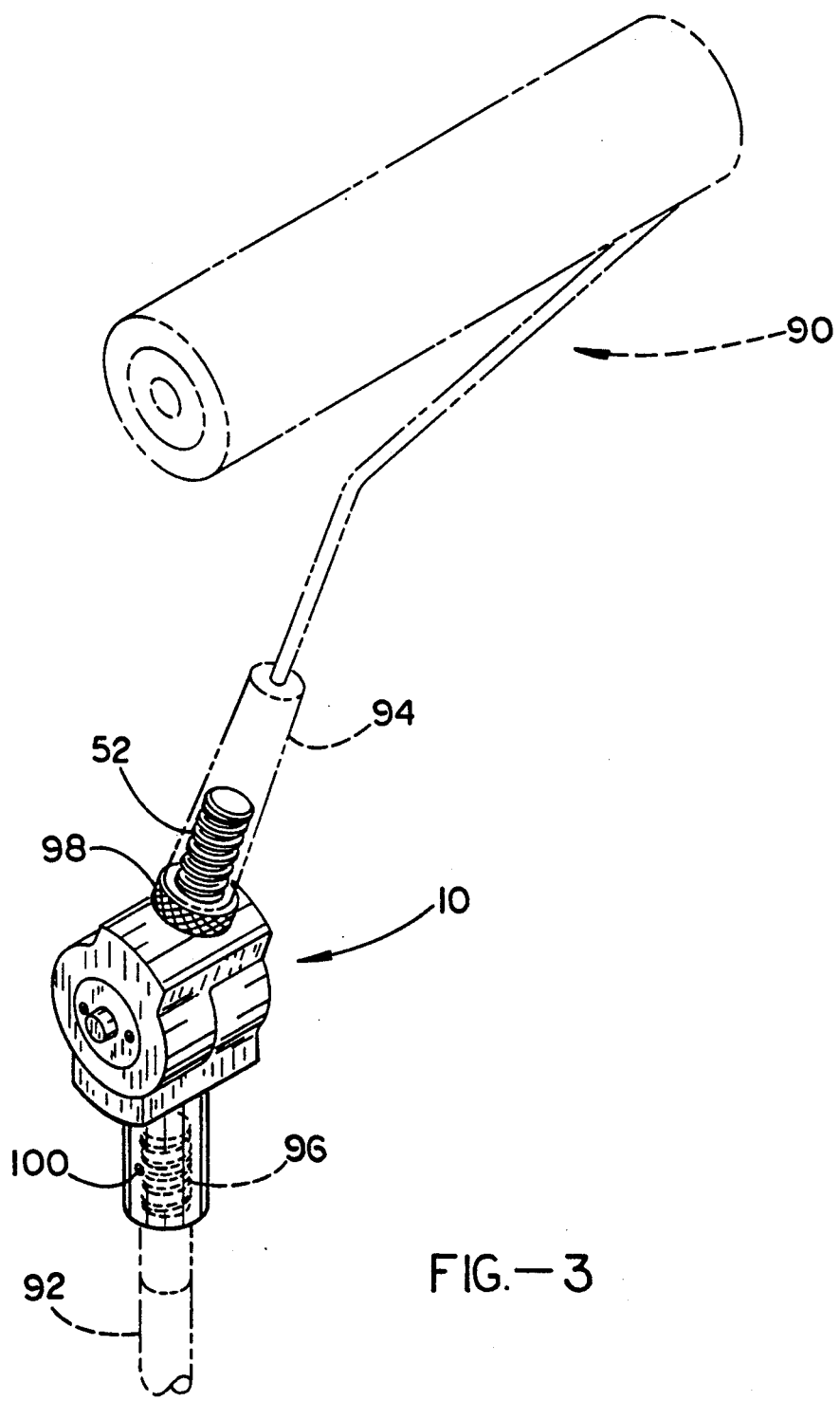

ARTICULATING POSITIONING DEVICE FOR TOOLS

BACKGROUND OF THE INVENTION

1. Field of the Invention

This invention pertains generally to maneuvering devices for tools and more particularly to an articulating joint apparatus for use with paint rollers, paint spray shields, paint brush holders, window cleaning equipment, concrete tools, brooms, and other devices to which a handle is to be attached.

2. Description of the Background Art

Many hand tools are commonly furnished with handles or handle extensions which are rigidly attached to the tool head. Often it is necessary to work with the tool in a position which is awkward for the user or which prevents the use from applying the desired amount of force or movement to the tool. Therefore, a need has existed for a device which can be positioned between the tool head and its handle or handle extension, to permit an otherwise rigid tool to articulate in several positions.

Examples of moveable joints for connecting components can be found in U.S. Pat. No. 3,419,295 issued to Small on Dec. 31, 1968, which discloses a three position adjustable hinge having a finger operated spring loaded "key" which permits engagement and disengagement of the joints; U.S. Pat. No. 3,487,689 issued to Weiss et al. on Jan. 6, 1970, which discloses an adjustable joint which has teeth-like projections at its outer perimeter, the teeth-like projections mating with a rotatable locking ring which is operated to engage or disengage the teeth-like projections; U.S. Pat. No. 4,530,262 issued to Pownall on Jul. 23, 1985, which discloses an articulating joint having an internal gear mechanism which is displacable by operating a push pin; U.S. Pat. No. 4,815,740 issued to Williams et al. on Mar. 28, 1989, which discloses a rotatable joint having serrated teeth on the inner face of each half of the joint and a knob which can be rotated to lock and unlock the joint; U.S. Pat. No. 4,614,452 issued to Wang on Sept. 30, 1986, which discloses an adjustable joint which has inner serrated teeth on each half to provide locking engagement and a lever which can be operated to lock and unlock the two halves; U.S. Pat. No. 2,680,032 issued to McClenahan on Jun. 1, 1954, which discloses an adjustable joint mechanism for paint brush handles which provides rotation about two axes; U.S. Pat. No. 4,962,722 issued to Thompson on Oct. 16, 1990, which discloses a hinged painting shield, the hinges of which have serrated teeth on their inner mating surfaces, adjustment being made by loosening a wing nut; U.S. Pat. No. 4,848,818 issued to Smith on Jul. 18, 1989, which discloses a gutter cleaning tool having hinges with serrated teach on their inner mating surfaces, adjustment being made by means of rotating the joint halves which are held in place by a spring tensioning mechanism; U.S Pat. No. 1,268,734 issued to Lay on Jun. 4, 1918, which discloses a brush on an elongated handle having articulating joints for rotation of the brush angle; U.S. Pat. No. 2,602,863 issued to Raymond et al. on Jul. 8, 1952, which discloses an adjustable arm for a telephone receiver having a joint with serrated teeth; and U.S. Pat. No. 3,277,601 issued to Ryan on Oct. 11, 1966, which discloses a teeth-like joint mechanism for dolls.

None of the foregoing devices, however, provide an articulating joint for attachment to a variety of tools, tool handles, and tool handle extensions, which can be easily adjusted with one hand, which resist interference with their operation from paint, concrete, mud and other contaminants, and which will not break or separate under high torque applications.

The foregoing patents reflect the state of the art of which the applicant is aware and are tendered with the view toward discharging applicant's acknowledged duty of candor in disclosing information which may be pertinent in the examination of this application. It is respectfully stipulated, however, that none of these patents teach or render obvious, singly or when considered in combination, applicant's invention herein.

SUMMARY OF THE INVENTION

The present invention provides a rotating joint mechanism for use with paint rollers, paint roller handles, paint roller extension rods, and other tools which are used in combination with detachable handles or extension rods. The invention generally comprises a shank with internal threads, a jointed coupling, and a shank with external threads. The jointed coupling includes two separable halves rotatable about a central axis through a displacement window of approximately 200 degrees.

The upper shank has external threads (male) for accepting a standard paint roller handle or the like (most paint roller handles now have female threads for connection to an extension rod). The lower shank has internal threads (female) for connection to an extension rod. Each half of the coupling is geared internally and may be locked into a selected position. Pressing a push button releases the gears for adjustment. Releasing the button engages the gears and locks the joint into place. The gear and lock mechanism is constructed such that the button can be depressed and the coupling adjusted to a new position with the use of only one hand.

When used in this fashion, a painter with a roller and extension rod can adjust the roller to nearly any angle, thereby permitting the painter to paint around moldings, under roof eaves, and other hard to roll surfaces conveniently and quickly. Other tools can be conveniently adjusted into otherwise awkward positions in similar fashion.

An object of the invention is to increase the usability of tools in positions beyond the user's normal reach.

Another object of the invention is to avoid the use and constant movement of ladders to reach awkward overhead positions with a tool.

Another object of the invention is to circumvent the need to use unstable platforms such as ladders.

Another object of the invention is to provide for adjustment of tools to a desired angle which would otherwise be unachievable.

Another object of the invention is to provide an adjustable joint mechanism which is adaptable to a variety of tools.

Another object of the invention is to make a rigid tool flexible.

Another object of the invention is to provide a joint mechanism which can be adjusted with one hand.

Another object of the invention is to provide for maneuverability of tools in hard to reach places.

Another object of the invention is to provide for horizontally painting outer reach surfaces with a paint roller and extension handle.

Another object of the invention is to provide a rotatable coupling which will not break or separate under high torque applications.

Another object of the invention is to provide a rotatable coupling for tools and handle/extension members which is self cleaning and resistant to contamination.

Another object of the invention is to provide a durable, long lasting joint, which can withstand daily rugged use by the construction industry.

Further objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only:

FIG. 3 is a perspective view of the present invention coupled to a paint roller shown in phantom and an extension rod shown in phantom.

DESCRIPTION OF THE PREFERRED EMBODIMENTS

Figure 1:
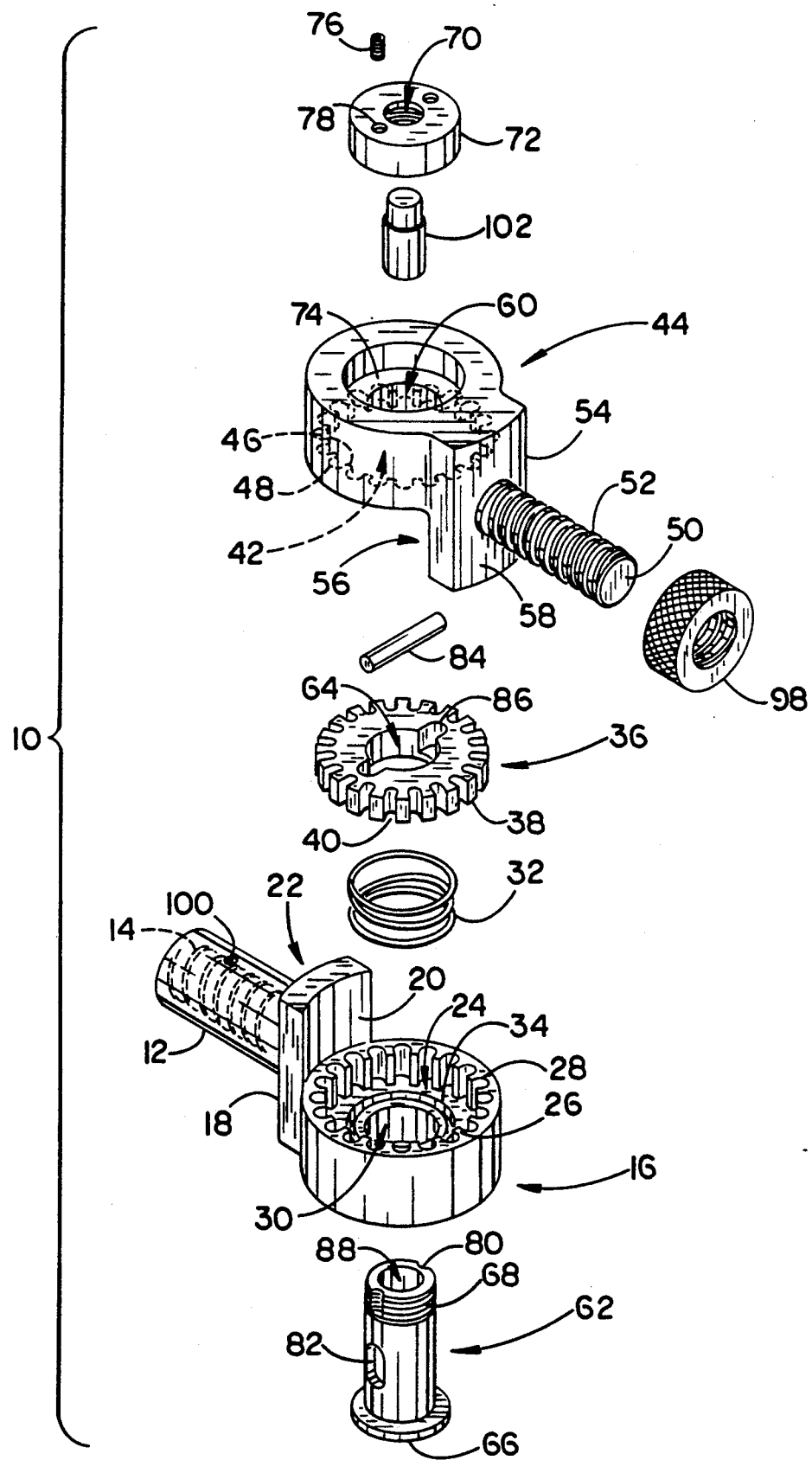
FIG. 1 is an exploded view of the present invention.

Referring more specifically to the drawings, for illustrative purposes the present invention is embodied in the apparatus 10 generally shown in FIG. 1. It will be appreciated that the apparatus may vary as to configuration and as to details of the parts without departing from the basic concepts as disclosed herein.

The apparatus 10 includes a cylindrically shaped hollow shaft 12 which contains internal annular threads 14, and which is coupled to housing member 16 which serves as one-half of a hinge mechanism. Housing member 16 includes side wall 18 which has a concave arcuate inner surface 20 and a convex arcuate outer surface 22. Housing member 16 also includes an annular cavity 24 with a plurality of teeth-like projections 26 and grooves 28 situated around the perimeter of cavity 24. Hole 30 is coaxially placed within cavity 24.

Figure 2:
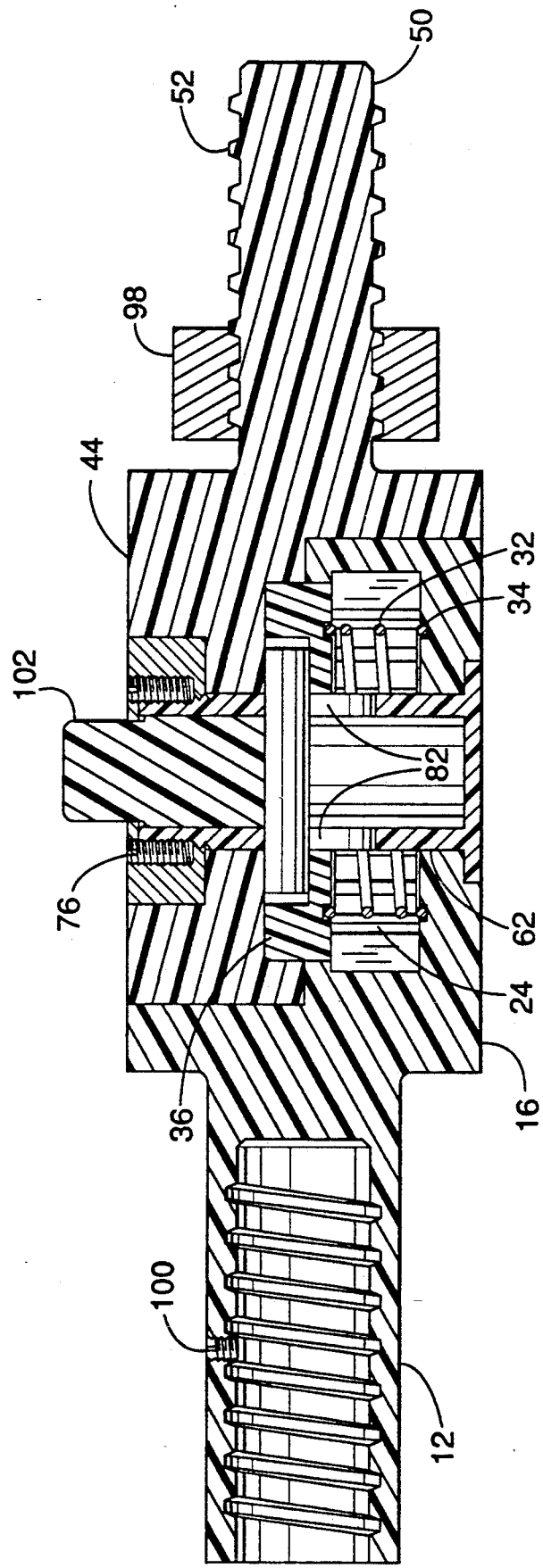
FIG. 2 is a cross-sectional view of the present invention.

Spring 32 seats in recess 34 to tension gear 36. Gear 36 includes a plurality of teeth-like projections and grooves 40 around its perimeter which permit gear 36 to mesh with cavity 24. While a single spring is preferred, a plurality of springs could also be employed. Referring also to FIG. 2, when gear 36 is placed within cavity 24, spring 32 normally positions gear 36 such that the lower one-half of gear 36 is situated in cavity 24 and the upper one-half of gear 36 is situated in cavity 42 of housing member 44. This feature permits gear 36 to lock the rotational positions of housing member 16 and housing member 44 while providing significant strength. Note, however, that cavity 24 is sufficiently deep to permit gear 36 to be fully depressed into cavity 24 and disengaged from housing member 44. Cavity 42 is identical in shape and configuration to cavity 24, except that the depth of cavity 42 is approximately one-half that of cavity 24. Cavity 42 contains a plurality of teeth-like projections 46 and grooves 48 around its perimeter for meshing with gear 36.

Shaft 50, which is cylindrically shaped and contains external annular threads 52, is coupled to housing member 44 which serves as the other half of the hinge mechanism. Housing member 44 includes side wall 54 which has a concave arcuate inner surface 56 and a convex arcuate outer surface 58 similar to that of side wall 18. Hole 60 is coaxially placed within cavity 42.

Base member 62 extends through hole 30 in housing member 16, hole 64 in gear 36, and hole 60 in housing member 44. One end of base member 62 includes a cap 66 which abuts the outer surface of housing member 16. The other end of base member 62 contains external annular threads 68 which engage threads 70 in cover plate 72. While base member 62 is shown as a separate component, it could alternatively be molded as an integral part of housing member 16.

Cover plate 72 fits within recess 74 in housing member 44 to hold the assembly together, with a plurality of set screws 76 extending through holes 78 and engaging notches 80 in base 62 to prevent rotation of cover plate 72 once assembled.

Base member 62 includes a plurality of elongated slots 82 through which bar 84 can be inserted. The ends of bar 84 fit within recesses 86 in gear 36 to couple gear 36 to base member 62. In this manner, gear 36 is held in place with tension being established by spring 32. Depressing bar 84 compresses spring 32 thereby permitting gear 36 to be completely displaced into cavity 24 since bar 84 moves within the elongated slots 82. Bar 84 is depressed by push button 102 which slides within base member 62 through hole 88.

Referring also to FIG. 3, the apparatus 10 can be attached to a paint roller 90 and an extension rod 92 or any combination of tools and handles or extension rods. Most paint rollers and similar tools contain a handle portion 94 or the like with internal female threads of a standard size which will mate with threads 52. Similarly, most extension rods and handles contain a male threaded portion 96 which will mate with threads 14. Threaded collar 98 is provided to permit handle portion 94 to be locked into place on shaft 50. Set screw 100 is provided to permit the user to lock extension rod 92 to shaft 12.

Note that the position of threads 14 and 52 on shafts 12 and 50, respectively, is merely for convenience and compatibility with existing tools. Therefore, either set of threads could be reversed in its position as necessary, both shafts could contain male threads, both shafts could contain female threads, or one or both shafts could be unthreaded and attached to the tools, handles, or extension rods with bolts, pins, compression couplings, or the like.

In operation, once the apparatus 10 is installed, the positional relationship between paint roller 90 and extension rod 92 is adjusted by depressing push button 102 to disengage gear 36 from teeth-like projections 46 and grooves 48 in cavity 42. Housing member 16 and housing member 44 can then be rotated into position, the amount of travel being limited to approximately two hundred degrees by side wall 18 and side wall 54. When the desired positional relationship is obtained, push button 102 is released thereby allowing spring 32 to return gear 36 to its normal position of being meshed both with teeth-like projections 26 and grooves 28 in housing member 16 and teeth-like projections 46 and grooves 48 in housing member 44.

Note also that side wall 18 and side wall 54 provides added strength, and prevent axial shear which can occur in high torque conditions. This results from the concave arcuate surfaces of the side walls abutting the exterior curved portions of the housing members. Paint or other materials which accumulate on the housing members can be removed by rotating the housing members thereby causing the materials to be scraped off by the side walls.

Housing member 16, housing member 44, and gear 36 are preferably fabricated from plastic materials such as teflon ®, Delron ® or other materials which provide strength and resistance to adhesion of paint and other contaminants. Use of these materials also permits the housing members to be machined as single pieces.

While the preferred embodiment of the present invention has been described herein, alternative embodiments may be constructed to perform the same or similar function. As an example, instead of using push button 102, a pull mechanism could be substituted. Also, gear 36, push button 102, and related components could be eliminated and replaced with a pin which extends through a hole in housing member 16 and into another hole in housing member 44, thus locking the apparatus into a fixed position. By locating a plurality of holes around the perimeters of housing member 16 and housing member 44, any number of desired positions could be selected and locked into place with the pin.

Accordingly, it will be seen that this invention provides a unique articulating joint mechanism for coupling tools to handles and extension rods. Although the description above contains many specificities, these should not be construed as limiting the scope of the invention but as merely providing illustrations of some of the presently preferred embodiments of this invention. Thus the scope of this invention should be determined by the appended claims and their legal equivalents.

I claim:

1. A hinged coupling unit, comprising:
   (a) a first support member;
   (b) a first housing member, said first housing member secured to and projecting from said first support member, said first housing member including a first cavity having a first annular toothed portion, said first housing member including a first through hole coaxial with said first annular toothed portion;
   (c) a second support member;
   (d) a second housing member, said second housing member secured to and projecting from said second support member, said second housing member including a second cavity having a second annular toothed portion, said second housing member including a second through hole coaxial with said second annular toothed portion;
   (e) a gear member, said gear member having an annular toothed perimeter for meshing with said first and second annular toothed portions, said gear member enclosed by said first and second cavities;
   (f) a spring member disposed between said gear member and said first housing member, said spring member normally positioning said gear member to simultaneously engage said first and second annular portions; and
   (g) release means for disengaging said gear member from said second annular portion and displacing said gear member into said first cavity whereby said gear member into said first cavity whereby said first and second housing members can be rotated, said release means extending through said second through hole, the terminal end of said release means engaging a rod, the longitudinal axis of said rod planarly aligned with said gear member, the ends of said rod engaging aligned recesses in said gear member, said gear member including a third through hole, said gear member slidable over a base member, said base member extending through said first and third through holes, said base member coupled to said first and second housing members, said base member including an elongated opening, said rod extending through said elongated opening, said gear member coupled to said base member by said rod.

2. The apparatus recited in claim 1, wherein said first and second housing members have abutting flat surfaces.

3. The apparatus recited in claim 1, wherein at least one of said support members comprises a hollow shaft, said hollow shaft having an internal annular threaded portion.

4. The apparatus recited in claim 1, wherein at least one of said support members comprises a shaft, said shaft having an external annular threaded portion.

5. The apparatus as recited in claim 1, said first support member comprising a hollow shaft having an internal annular threaded portion, said second support member comprising a shaft having an external annular threaded portion.

6. The apparatus recited in claim 4, further comprising a collar, said collar having a threaded opening for engaging said external threaded portion of said shaft.

7. The apparatus recited in claim 5, further comprising a collar, said collar having a threaded opening for engaging said external threaded portion of said second support member.

8. An apparatus for rotatably coupling a support member to a hand operated tool, comprising:
   (a) a first shaft;
   (b) first coupling means for coupling said first shaft to a support member for a hand operated tool;
   (c) a second shaft;
   (d) second coupling means for coupling said second shaft to a hand operated tool;
   (e) a first hinge member, said first hinge member projecting from one end of said first shaft, said first hinge member including a first cavity having a first annular toothed portion, said first hinge member including a first through hole coaxial with said first annular toothed portion;
   (f) a second hinge member, said second hinge member projecting from one end of said second shaft, said second hinge member including a second cavity having a second annular toothed portion, said second hinge member including a second through hole coaxial with said second annular toothed portion;
   (g) a gear member, said gear member having an annular toothed perimeter for meshing with said first and second annular toothed portions, said gear member enclosed by said first and second cavities;
   (h) a spring member disposed between said gear member and said first hinge member, said spring member normally positioning said gear member to simultaneously engage said first and second annular portions; and
   (i) a push button member, said push button member extending through said second through hole, the terminal end of said push button member engaging a rod, the longitudinal axis of said rod planarly aligned with said gear member, the ends of said rod engaging aligned recesses in said gear member, said gear member including a third through hole, said gear member slidable over a base member, said base member extending through said first and third through holes, said base member coupled to said first and second hinge members, said base member including an elongated opening, said rod extending through said elongated opening, said gear member coupled to said base member by said rod.

9. The apparatus recited in claim 8, wherein said first and second housing members have abutting flat surfaces.

10. The apparatus recited in claim 8, wherein said first coupling means comprises a threaded hollow in said first shaft.

11. The apparatus recited in claim 10, wherein said second coupling means comprises threads positioned externally to said second shaft.

12. The apparatus recited in claim 8, further comprising a collar, said collar rotatably coupled to said second coupling means.

13. An adjustable device for coupling a paint roller to an extension rod, comprising:
   (a) a first hinge member, said first hinge member including a first cavity having a first annular toothed portion, said first hinge member including a first opening coaxial with said first annular toothed portion;
   (b) a first shaft member, said first shaft member including a threaded hollow portion, said threaded hollow portion adapted for coupling to a handle/extension member, said first shaft member projecting from said first hinge member;
   (c) a second hinge member, said second hinge member including a second cavity having a second annular toothed portion, said second hinge member including a second opening coaxial with second annular toothed portion;
   (d) a second shaft member, said second shaft member including an external threaded portion, said external threaded portion adapted for coupling to a tool, said second shaft member projecting from said second hinge member;
   (e) a gear member, said gear member having an annular toothed perimeter for meshing with said first and second annular toothed portions, said gear member enclosed by said first and second cavities;
   (f) a spring member disposed between said member and said first hinge member, said spring member normally positioning said gear member to simultaneously engage said first and second annular portions; and
   (g) a push button member, said push button member extending through said second opening, the terminal end of said push button member engaging a rod, the longitudinal axis of said rod planarly aligned with said gear member, the ends of said rod engaging aligned recesses in said gear member, said gear member including a third opening, said gear member slidable over a base member, said base member extending through said first and third openings, said base member coupled to said first and second hinge members, said base member including an elongated opening, said rod extending through said elongated opening, said gear member coupled to said base member by said rod whereby depressing said push button member disengages said gear member from said second annular portion for rotation of said first and second hinge members.

14. The apparatus recited in claim 13, wherein said first and second hinge members have abutting flat surfaces.

15. The apparatus recited in claim 14, further comprising a collar, said collar rotatably coupled to said second shaft member.

* * * * *